R. B. LLOPART.
SMELTING FURNACE.
APPLICATION FILED JAN. 26, 1917.
1,253,064.
Patented Jan. 8, 1918.
4 SHEETS—SHEET 1.
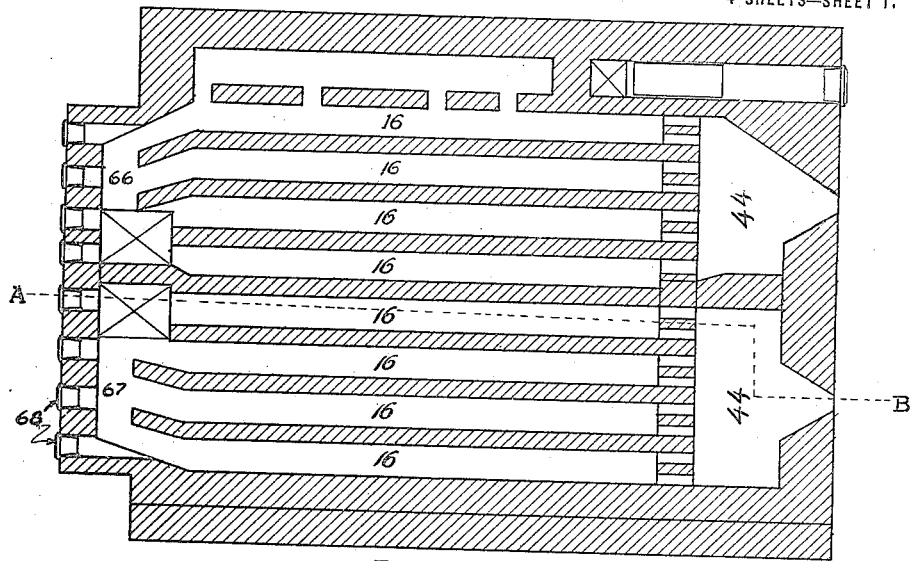
FIG. II
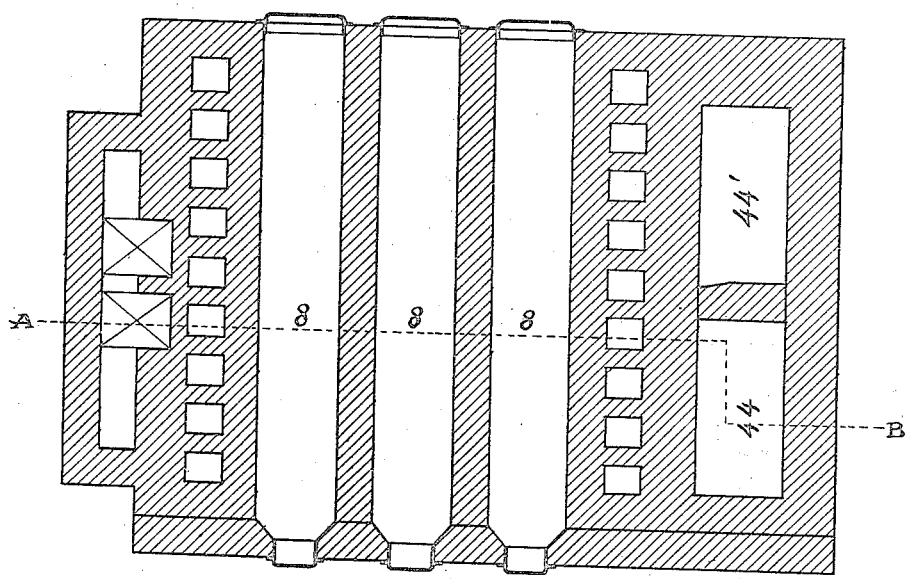
FIG. I
INVENTOR
RAMÓN BONASTRE LLOPART.
ATTORNEY

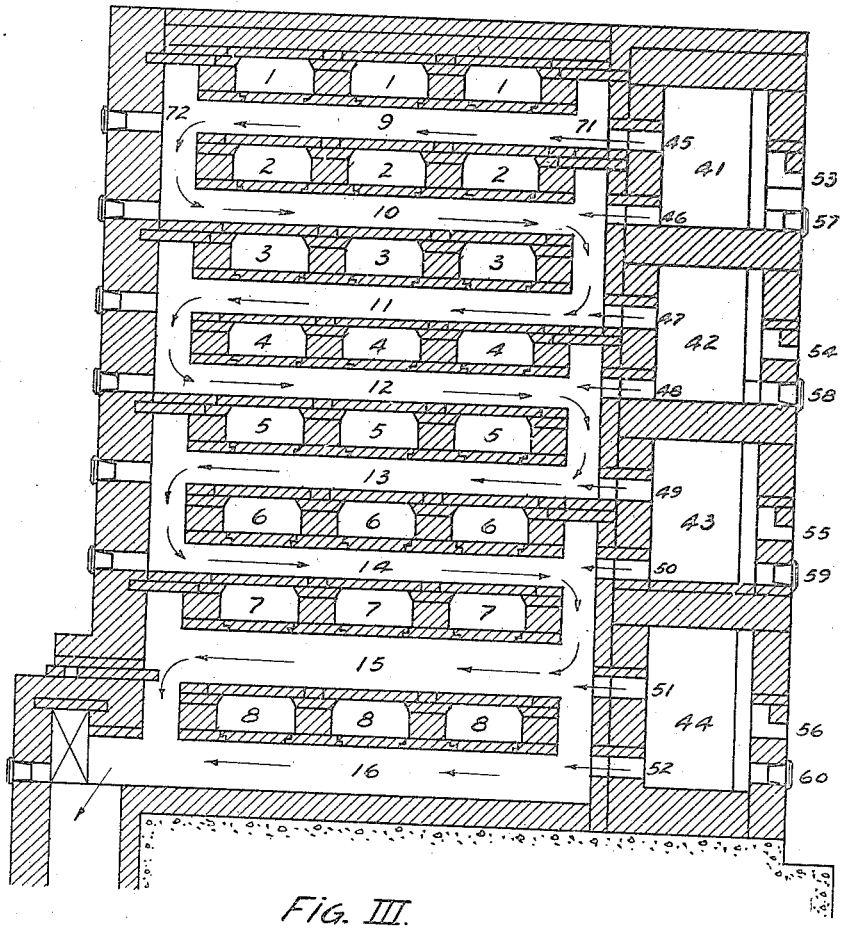
FIG. III.

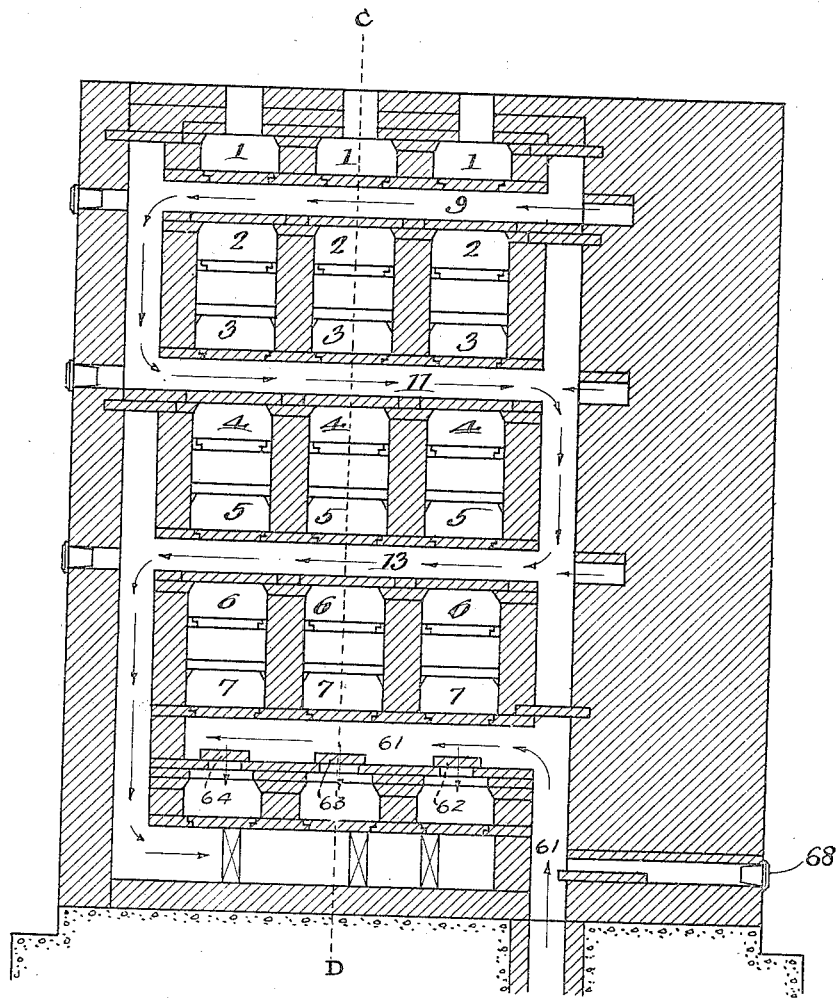
FIG. IV

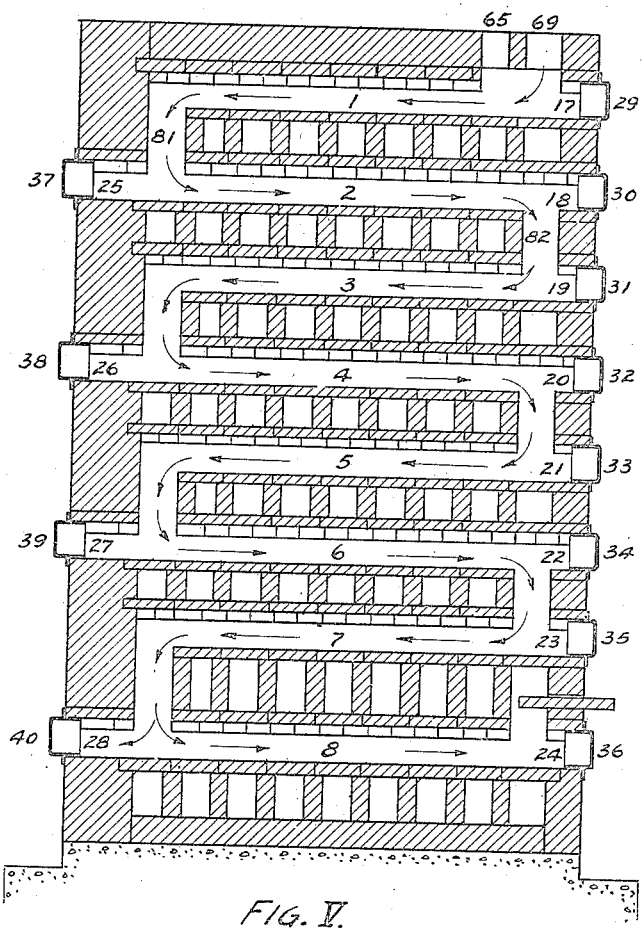
FIG. V.

UNITED STATES PATENT OFFICE.

RAMÓN BONASTRE LLOPART, OF ST. LOUIS, MISSOURI, ASSIGNOR TO MINERAL REFINING AND CHEMICAL CORPORATION, OF ST. LOUIS, MISSOURI, A CORPORATION OF DELAWARE.

SMELTING-FURNACE.

1,253,064.　　　　Specification of Letters Patent.　　　Patented Jan. 8, 1918.

Application filed January 26, 1917.　Serial No. 144,578.

*To all whom it may concern:*

Be it known that I, RAMÓN BONASTRE LLOPART, a subject of the King of Spain, residing at St. Louis, Missouri, U. S. A., have invented new and useful Improvements in Smelting-Furnaces, of which the following is a full, clear, and exact description, references being had to the accompanying drawings, forming a part of this specification.

My invention relates to an improved furnace designed for separating metals, and their compounds from their ores, as for instance for producing zinc sulfate or other zinc compounds from zinc blende, or carbonate and silicate from calamin; or for reducing ores containing both calamin and blende into sulfates, carbonates and silicates; whether said ores are in their natural state or are converted wholly or partly into oxids; and for converting zinc blende into zinc sulfate under the process described in Letters Patent of the United States No. 1,142,795, issued to me June 15, 1915, the principal object of my invention being the production of a furnace for the purposes aforesaid in a substantial, practical and efficient form. A further object of my invention is the production of such a furnace as will in the utilization of the process patented to me under Letters Patent aforesaid most economically effect the conversion of zinc blende or other ores into zinc sulfates, or other ores into compounds, and to effect said conversion with a high percentage yield.

My improved furnaces comprise coöperating and interlocking systems of ore muffles and heating flues, with necessary ore and stoke ports to facilitate feeding the ores through the furnace; means for supplying heat for roasting ores; and means for subjecting the ores while in process of roasting to the action of reaction gases. As described in this specification and drawings, the down draft system of flues is contemplated, although in the employment of my improvements, the draft may be either down or up through the heating flues. Furthermore, in the roasting of ores in my furnace, said ores, may be either dry or wet, or barytes or other reagents may be added.

In the drawings, Figure I represents a plan view of my improved furnace, showing the lay-out of the muffles; Fig. II a plan view showing the lay-out of the flues; Fig. III, a vertical section taken on line A. B. in Fig. I; Fig. IV, a frontal vertical section taken on a plane parallel to that of Fig. III, but immediately inside of the front wall of the furnace; Fig. V, a vertical section on line C D in Fig. IV.

Similar figures refer to similar parts throughout the several views.

In the preferred construction of my invention and referring more particularly to the drawings, 1, 2, 3, 4, 5, 6, 7 and 8 represent a system of muffles, which are connected alternately from side to side as they proceed from the top to the bottom of my improved furnace, so as to form a zigzag course or ore-way. This system of muffles may be extended to any required number; 9, 10, 11, 12, 13, 14, 15 and 16 represent a series of tiers of flues, which are likewise connected end to end alternately from side to side in course, so as to form a continuous zig-zag flue-way transversely interlocking with the system of muffles from top to bottom of said furnace. Said system of flues may be extended to any required number. The inter-relation of the flues and muffles aforesaid is such that the lines of action of one extend transversely across the lines of action of the other, and by this arrangement as the heat generated in the furnace takes its course through the flues aforesaid from the top of the furnace to the bottom thereof, a down-draft furnace being shown herein, said heat passes transversely across first the under side of the upper tier of muffles, through the flue 9, thence downward and transversely across the second tier of muffles 2, in a reverse direction through the flue 10, and thence downward transversely across the third tier of muffles 3, through the flue 11, until the heat reaches the bottom of the furnace through the course of the flues aforesaid, and is exhausted into the waste gas flues 66 and 67, leading to the chimney. This alternating course of the heat through the flues is caused by the zig-zag arrangement of said flues, as described and shown in drawings. The muffles are likewise off-set one against the other in zig-zag arrangement from top to bottom of the furnace, and are set as aforesaid transversely as to the line of action of the flues. By this arrangement the heat proceeding through the flues from top to bottom embraces and encircles the tiers of muffles transversely. In other words the top tier of muffles 1, is drawn close to one side of the furnace, leaving a flue-way 71, intervening between said tier of muffles and the opposite side of the furnace. The next tier of muffles 2, is drawn close to said opposite side of the furnace, leaving a flue way 72, intervening between said tier of muffles and its adjacent side of the furnace, and so on from top to bottom of the furnace this alternate arrangement of the tiers of muffles is continued as shown in drawings, the heat taking the course indicated by the arrows. It will thus be seen that the heat in passing through the flue-ways from top to bottom of the furnace is compelled to pass around each tier of muffles in turn.

The mufflers are also arranged in tiers in alternate disposition from top to bottom of the furnace on longitudinal lines at right angles to the longitudinal lines of the flues, so as to leave alternating vertical connecting passage-ways at the end of each tier of muffles, to facilitate the passage of ores downward from one tier of muffles to the next below as will be shown later on. In other words the top tier of muffles 1, is drawn forward close to the end side of the furnace leaving an ore-way 81 between the end of that tier of the adjacent side of the furnace for the passage of ores from tier 1 to tier 2. The next tier of muffles is drawn close to the opposite side of the furnace leaving an ore-way 82 between the end of that tier and the adjacent side of the furnace for the passage of ores from tier 2 to tier 3 and so on from top to bottom, and the ores taking the course indicated by the arrows.

At the point where each tier of muffles comes into contact with the furnace wall, said wall is pierced with openings or stoke-doors 17, 18, 19, 20, 21, 22, 23, 24, 25, 26, 27, 28 which openings are provided with doors, 29, 30, 31, 32, 33, 34, 35, 36, 37, 38, 39, and 40. These stoke-doors are provided for the purpose of facilitating the passage of ores through the furnace from top tier of muffles 1 to the lower tier 8, and finally to facilitate the taking out of said ores from the furnace after the process of roasting has been completed, as will be hereinafter described.

The furnace is heated by a system of oil burners, or other suitable means. The fuel, as oil for instance, is projected into combustion chambers as shown at 41, 42, 43, and 44 and 41′, 42′, 43′ and 44′ not shown. These combustion chambers are spaced and separated by suitable walls, so as to control one or more of the flues as may be desired. As shown in the drawings, each tier of combustion chamber controls two tiers of flues, but this arrangement may be varied. Suitable openings, 45, 46, 47, 48, 49, 50 and 52, and 45′, 46′, 47′, 48′, 49′, 50′, 51′, and 52′ not shown, connect the combustion chambers with the flues as shown. The fuel, as oil for instance, is projected into the combustion chambers aforesaid through openings, 53, 54, 55, and 56, and 53′, 54′, 55′, 56′ not shown, and said fuel is ignited and consumed within said combustion chambers, thereby producing the required heat for the furnace. Control dampers 57, 58, 59, and 60 are provided to control the degree of heat within said combustion chambers.

A reaction gas flue 61 is provided for introduction of the required reaction gases into the bottom tier of muffles; the reaction gases passing upward through said flue 61 are admitted into the lower tier of muffles through dampers as shown at 62, 63, 64, whence said reaction gases pass upward through successive tiers of mufflers in opposite direction to the course of the ores, and pass out at an opening or ventport 65. The waste gases resulting from the consumption of fuel, after leaving the lower tier of flues pass into the discharge flues 66, 67, whence they are drawn into the chimney. Stopper plugs 68 are provided to facilitate the cleaning of the waste material from the lower tier of flues.

In operation the ore required to be roasted is first fed into the top tier of muffles 1, from a hopper or otherwise, through the port 69, whence it is spread to the required thickness through the first tier of muffles, and is subjected to heat from the adjacent combustion chambers. After being roasted in that tier of muffles the required length of time, the ore is transferred to the next lower tier of muffles 2, by an operator working through the stoke-door 29, the ore being pushed and crowded back to the opposite end of the muffle where it falls into the next tier of muffles 3, and is redistributed through said tier of muffles by an operator working through the stoke-doors 30 and 37. Thus the ore is transferred successively from the topmost tier of muffles 1, to the lowermost tier of muffles 8, and is subjected to any required degree of heat by manipulation of the adjacent combustion chambers. Concurrently with the roasting process, reaction gases are admitted into the bottom of the furnace through the reaction gas-flue 61, as aforesaid and proceeding upward through the successive tiers of muffles act upon the ores while same are being roasted. When the ores in thus passing through the furnace downward from muffle to muffle, and so subjected to the action of required reaction gases have been sufficiently roasted and treated for the purpose required, they are withdrawn by an operator from the lower tier of muffles, working through the stoke-doors 24 and 28.

While I have herein described a certain specific manner and method of constructing my said furnace, it is understood that I may vary from same in minor details of construction, not departing from the spirit of my invention, so as best to construct said furnace in a practical and efficient form.

What I claim to be new and patentable is:

1. In combination with inclosing walls and a chimney suitably connected, a down-draft smelting furnace comprising a plurality of connected horizontal heating flues; a plurality of connected horizontal ore muffles disposed alternately and transversely to said heating flues; a plurality of combustion chambers disposed vertically adjacent to and controlling said heating flues; an ore port at the top for feeding ores into the uppermost muffles; a reaction gas flue at the bottom to admit reaction gases into the lowermost muffles; and a vent port at the top for escape of said reaction gases.

2. In combination with inclosing walls and a chimney suitably connected to produce a down-draft through the furnace; a down-draft smelting furnace comprising a plurality of horizontal tiers of vertically spaced heating flues; a plurality of sets of vertical connecting flues disposed to connect, vertically, the opposite, alternate ends of said tiers of heating flues to conduct the heat downward; a plurality of discharge flues connecting the lowermost tier of heating flues with said chimney; a plurality of combustion chambers disposed vertically adjacent to, connected with and controlling said heating flues; a plurality of horizontal tiers of ore muffles located transversely through the spaces between said heating flues; a plurality of sets of vertical connecting ore ways disposed to connect, vertically, the opposite, alternate ends of said tiers of ore muffles, as means for feeding the ore downward through successive tiers of muffles; a plurality of stoke doors leading into the ore muffles, to facilitate working the ore downward through successive tiers of muffles; an ore port at the top for feeding ores into the uppermost tier of muffles; a reaction gas-flue at the bottom for admitting reaction gases into the lowermost muffles; and a vent port at the top for escape of said reaction gases.

3. In combination with inclosing walls and a chimney, a smelting furnace embodying ore muffles for conveying the ores from top to bottom, through and out of the furnace; heating flues arranged transversely to said ore muffles, and having exits at their lowermost points into the chimney, so as to produce a down-draft through the furnace; combustion chambers arranged adjacent to, connected with and controlling the generation and projection of heat into said flues; and a reaction gas flue connected with said ore muffles at the lowermost point, for passing reaction gases upward through said muffles in a direction contrary to the downward course of the ores and the heat aforesaid.

4. In combination with inclosing walls and a chimney, a smelting furnace comprising a plurality of tiers of connected, horizontal heating flues; a plurality of tiers of connected, horizontal ore muffles, arranged transversely to said flues; a plurality of combustion chambers arranged adjacent to, connected with and controlling said flues; means for working ores through the muffles from top to bottom; means for forcing a down-draft through the flues; and means for passing reaction gases upward through the ore muffles contrary to the course of said ores and heat.

5. In combination with inclosing walls and a chimney; a smelting furnace, comprising a plurality of horizontal ore muffles, spaced apart, positioned one above another, and connected at alternate ends so as to form a continuous zig-zag passage from top to bottom; means for working ores through said muffles from top to bottom; means for supplying a flow of heat from top to bottom through the intervening spaces between said muffles; and means for passing reaction gases upward through said ore muffles, contrary to the course of the ores and heat aforesaid.

6. A smelting furnace combining inclosing walls; a chimney; a plurality of horizontal tiers of vertically connected ore muffles, so spaced apart vertically that the intervening spaces form *per se* a similar, transverse system of horizontal, vertically connected, heat flue ways; a plurality of independent combustion chambers arranged adjacent to and controlling said flue ways; means for forcing a down-draft through said flue ways; means for supplying and working ores downward through said muffles; and a reaction gas flue connecting with the bottom tier of muffles, for conveying reaction gases upward through the muffles.

RAMÓN BONASTRE LLOPART.

Witnesses:
José G. Loover,
C. W. Marsh.